United States Patent
Huang et al.

(10) Patent No.: US 12,530,845 B2
(45) Date of Patent: Jan. 20, 2026

(54) HYBRID GEOMETRIC PRIMITIVE REPRESENTATION FOR POINT CLOUDS

(71) Applicants: TOYOTA RESEARCH INSTITUTE, INC., Los Altos, CA (US); MASSACHUSETTS INSTITUTE OF TECHNOLOGY, Cambridge, MA (US)

(72) Inventors: Xiangru Huang, Zhejiang (CN); Marianne Arriola, Cambridge, MA (US); Yue Wang, Cambridge, MA (US); Vitor Campagnolo Guizilini, Santa Clara, CA (US); Rares Andrei Ambrus, San Francisco, CA (US); Justin Solomon, Somerville, MA (US)

(73) Assignees: TOYOTA RESEARCH INSTITUTE, INC., Los Altos, CA (US); TOYOTA JIDOSHA KABUSHIKI KAISHA, Aichi-Ken (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 182 days.

(21) Appl. No.: 18/444,490

(22) Filed: Feb. 16, 2024

(65) Prior Publication Data
US 2024/0320915 A1    Sep. 26, 2024

Related U.S. Application Data

(60) Provisional application No. 63/449,288, filed on Mar. 1, 2023.

(51) Int. Cl.
G06T 17/10    (2006.01)
G06V 20/56    (2022.01)

(52) U.S. Cl.
CPC .............. *G06T 17/10* (2013.01); *G06V 20/56* (2022.01)

(58) Field of Classification Search
None
See application file for complete search history.

(56) References Cited

U.S. PATENT DOCUMENTS 9,183,631 B2    11/2015    Taguchi et al.
11,043,026 B1   6/2021    Fathi et al.
(Continued)

OTHER PUBLICATIONS

Shi et al., PV-RCNN: Point-Voxel Feature Set Abstraction for 3D Object Detection; arXiv:1912.13192v2, Apr. 9, 2021.
(Continued)

*Primary Examiner* — Nurun Flora
(74) *Attorney, Agent, or Firm* — Sayfarth Shaw LLP

(57) ABSTRACT

A method for generating a visual representation of an environment based on a point cloud includes hierarchically processing the point cloud with different granularity levels to generate multiple groups of primitives and multiple sets of points. The method also includes generating a group of intermediate sets associated with the point cloud, each intermediate set associated with one of the multiple groups of primitives and one of the multiple sets of points, having a same granularity level. The method further includes iteratively determining respective features associated with each intermediate set of a sequence of intermediate sets, each intermediate set included the set of primitives and the set of points, the respective features including first features of the set of primitives and second features of the set of points. The method still further includes generating the visual representation based on the respective features of each one of the sequence of intermediate sets.

20 Claims, 6 Drawing Sheets

(56) References Cited

U.S. PATENT DOCUMENTS

| | | | | |
|---|---|---|---|---|
| 11,816,798 | B1* | 11/2023 | Angles | G06T 17/205 |
| 11,893,692 | B1* | 2/2024 | Baize | G06T 17/205 |
| 2011/0304619 | A1 | 12/2011 | Fu et al. | |
| 2019/0354832 | A1 | 11/2019 | Bronstein et al. | |
| 2021/0141100 | A1* | 5/2021 | Castorena Martinez | G01S 5/0072 |
| 2022/0198813 | A1 | 6/2022 | Chiu et al. | |
| 2023/0419609 | A1* | 12/2023 | Wang | G06N 3/0895 |
| 2025/0166234 | A1* | 5/2025 | Zhang | G06T 13/20 |
| 2025/0225730 | A1* | 7/2025 | Fathi | G06T 17/05 |

OTHER PUBLICATIONS

Wang et al., Object DGCNN: 3D Object Detection using Dynamic Graphs; arXiv:2110.06923v1, Oct. 13, 2021.

Fischler et al., Random Sample Consensus: A Paradigm for Model Fitting with Applications to Image Analysis and Automated Cartography; Communications of the ACM, vol. 24, Issue 6, pp. 381-395; Jun. 1, 1981.

Monti et al., Geometric Deep Learning on Graphs and Manifolds Using Mixture Model CNNs, arXiv:1611.08402v.3; Dec. 6, 2016.

Ronneberger et al., U-Net: Convolutional Networks for Biomedical Image Segmentation, arXiv:1505.04597v1; May 18, 2015.

Wang et al., Dynamic Graph CNN for learning on Point Clouds; arXiv:1801.07829v2; Jun. 11, 2019.

Hsieh et al., Coarse- and Fine-Scale Geometric Information Content of Multiclass Classification and Implied Data-driven Intelligence; arXiv:2104.07191v1; Apr. 15, 2021.

Ran et al., Surface Representation for Point Clouds; arXiv:2205.05740v2; May 13, 2022.

Zhang et al., Weakly Supervised Semantic Segmentation for Large-Scale Point Cloud; The Thirty-Fifth AAAI Conference on Artificial Intelligence (AAAI-21); May 2021.

\* cited by examiner

HYBRID GEOMETRIC PRIMITIVE REPRESENTATION FOR POINT CLOUDS

CROSS-REFERENCE TO RELATED APPLICATION

The present application claims the benefit of U.S. Provisional Patent Application No. 63/449,288, filed on Mar. 1, 2023, and titled "HYBRID GEOMETRIC PRIMITIVE REPRESENTATION FOR POINT CLOUDS," the disclosure of which is expressly incorporated by reference in its entirety.

FIELD OF THE DISCLOSURE

Certain aspects of the present disclosure generally relate to point clouds, and more specifically to systems and methods for representing point clouds as combinations of primitives and points.

BACKGROUND

Autonomous agents (e.g., vehicles, robots, etc.) rely on machine vision for detecting objects in an environment. In some cases, a point cloud may be used to detect one or more objects in an environment. The point cloud may be generated based on measurements taken by a sensor, such as a LiDAR sensor or another type of 3D sensing device. An agent, such as an autonomous agent, may perform one or more tasks, such as navigating through an environment, based on detecting the objects. Conventional point clouds may be irregular and sparse. Furthermore, object detection systems, or other types of machine learning models, that use point clouds may be resource intensive. It may be desirable to identify geometric primitives in point clouds to improve performance while exploiting heterogeneous features of the point clouds.

SUMMARY

In one aspect of the present disclosure, a method for generating a visual representation of an environment based on a point cloud associated with the environment includes hierarchically processing the point cloud with different granularity levels to generate multiple groups of primitives and multiple sets of points, each group of primitives and set of points associated with a respective granularity level. The method further includes generating a group of intermediate sets associated with the point cloud, each intermediate set associated with one group of primitives, of the multiple groups of primitives, and one set of points, of the multiple sets of points, having a same granularity level. The method also includes iteratively determining respective features associated with each intermediate set of a sequence of intermediate sets, each intermediate set included the set of primitives and the set of points, the respective features including first features of the set of primitives and second features of the set of points. The method further includes generating the visual representation based on the respective features of each intermediate set of the sequence of intermediate sets.

Another aspect of the present disclosure is directed to an apparatus including means for hierarchically processing the point cloud with different granularity levels to generate multiple groups of primitives and multiple sets of points, each group of primitives and set of points associated with a respective granularity level. The apparatus further includes means for generating a group of intermediate sets associated with the point cloud, each intermediate set associated with one group of primitives, of the multiple groups of primitives, and one set of points, of the multiple sets of points, having a same granularity level. The apparatus also includes means for iteratively determining respective features associated with each intermediate set of a sequence of intermediate sets, each intermediate set included the set of primitives and the set of points, the respective features including first features of the set of primitives and second features of the set of points. The apparatus further includes means for generating the visual representation based on the respective features of each intermediate set of the sequence of intermediate sets.

In another aspect of the present disclosure, a non-transitory computer-readable medium with non-transitory program code recorded thereon is disclosed. The program code is executed by a processor and includes program code to hierarchically process the point cloud with different granularity levels to generate multiple groups of primitives and multiple sets of points, each group of primitives and set of points associated with a respective granularity level. The program code also includes program code to generate a group of intermediate sets associated with the point cloud, each intermediate set associated with one group of primitives, of the multiple groups of primitives, and one set of points, of the multiple sets of points, having a same granularity level. The program code further includes program code to iteratively determine respective features associated with each intermediate set of a sequence of intermediate sets, each intermediate set included the set of primitives and the set of points, the respective features including first features of the set of primitives and second features of the set of points. The program code further includes program code to generate the visual representation based on the respective features of each intermediate set of the sequence of intermediate sets.

Some other aspects of the present disclosure are directed to an apparatus having one or more processors, and one or more memories coupled with the one or more processors and storing instructions operable, when executed by the one or more processors, to cause the apparatus to hierarchically process the point cloud with different granularity levels to generate multiple groups of primitives and multiple sets of points, each group of primitives and set of points associated with a respective granularity level. Execution of the instructions also cause the apparatus to generate a group of intermediate sets associated with the point cloud, each intermediate set associated with one group of primitives, of the multiple groups of primitives, and one set of points, of the multiple sets of points, having a same granularity level. Execution of the instructions further cause the apparatus to iteratively determine respective features associated with each intermediate set of a sequence of intermediate sets, each intermediate set included the set of primitives and the set of points, the respective features including first features of the set of primitives and second features of the set of points. Execution of the instructions also cause the apparatus to generate the visual representation based on the respective features of each intermediate set of the sequence of intermediate sets.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
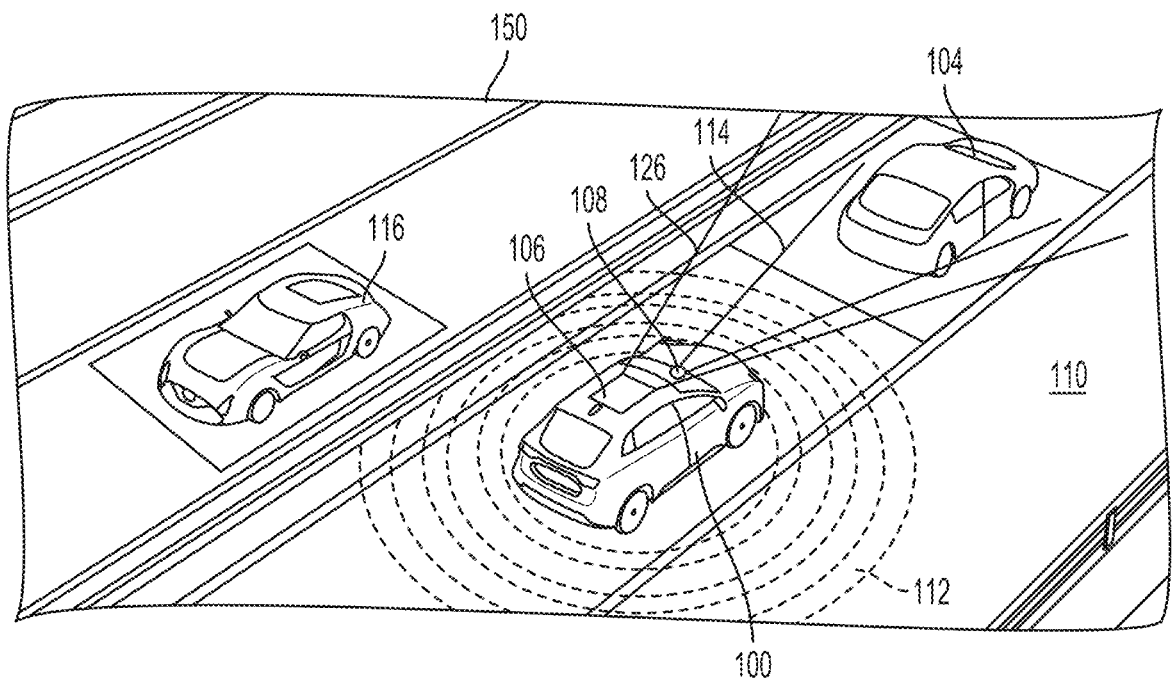
FIG. 1A is a diagram illustrating an example of a vehicle in an environment, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Point clouds may be obtained from one or more sensors, such as one or more light detection and ranging (LiDAR) sensors and/or other 3D sensing devices. These point clouds may be used in machine learning models, including deep learning models, to extract information pertaining to a given environment. Although point clouds are commonly used, they present challenges to machine learning due to their irregular and sparse nature. The sampling densities and patterns in point clouds tend to be heterogeneous, depending on the specific data collection procedure. In some examples, the sampling densities and patterns may be influenced by factors such as local curvature, motion, and distance to the sensor. Conventional neural architectures for point cloud data typically employ homogeneous graphs, wherein each node represents the same level of abstraction, such as a voxel or a cluster of similarly sized points. However, the development of a homogeneous approach capable of accommodating heterogeneous point clouds remains a difficult and unresolved issue.

Various aspects of the present disclosure are directed to a heterogeneous graph neural network architecture for point cloud data that distinguishes between two types of nodes: isolated points and geometric primitives, such as line segments, planar patches, and volumetric boxes. By recognizing the presence of geometric primitives, the disclosed architecture improves efficiency and performance (e.g., reduces memory use and processor use) for various point cloud processing tasks.

In some aspects, a pipeline for processing point clouds is proposed. The pipeline leverages both geometric primitives and individual points as nodes in a graph neural network to process point clouds. In certain examples, an object or scene may be represented as a combination of planes and points, providing greater flexibility while simplifying clusters of points into basic primitives. In some examples, the pipeline for processing point clouds replaces point clusters with geometric primitives whenever possible with high confidence. Additionally, or alternatively, the pipeline for processing point clouds constructs graph convolutional-style layers that leverage the structure of a 3D Euclidean space to integrate volumetric geometric primitives and sparse points into a unified framework. Thus, various aspects of the present disclosure use a combination of sparse points and geometric primitives to improve point cloud processing. For example, the use of sparse points and geometric primitives may reduce memory consumption and decrease processor load.

Specifically, in some examples, the point cloud may be processed to obtain a set of primitives and a set of points. A hierarchical graph neural network may process a sequence of coarse-to-fine intermediate sets, each set may include a mixture of points and primitives. Respective features of each set may be computed using a bipartite graph between the current set and the previous set. As an example, a geometric primitive may be a line, a plane, or a volume. The respective features may be used by an agent to perform a task, such as identifying one or more objects in an environment and/or navigating through an environment. Other types of tasks are also contemplated.

In some aspects, the point cloud may be captured via one or more sensors associated with an agent, such as an autonomous agent or a semi-autonomous agent. A vehicle is an example of an agent. However, aspects of the present disclosure are not limited to vehicles. Aspects of the present disclosure also contemplate other types of agents, such as robotic devices. Additionally, the agent may operate in an autonomous mode, a manual mode, or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
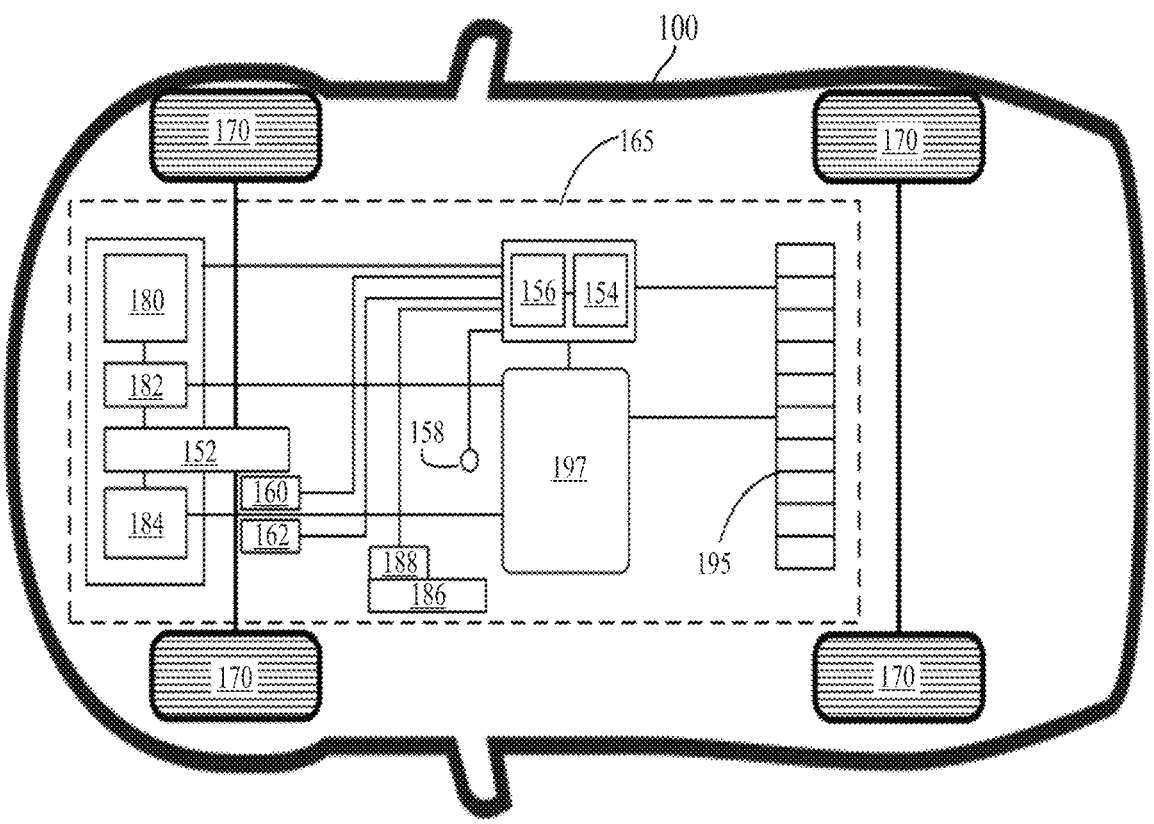
FIG. 1B is a diagram illustrating an example a vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
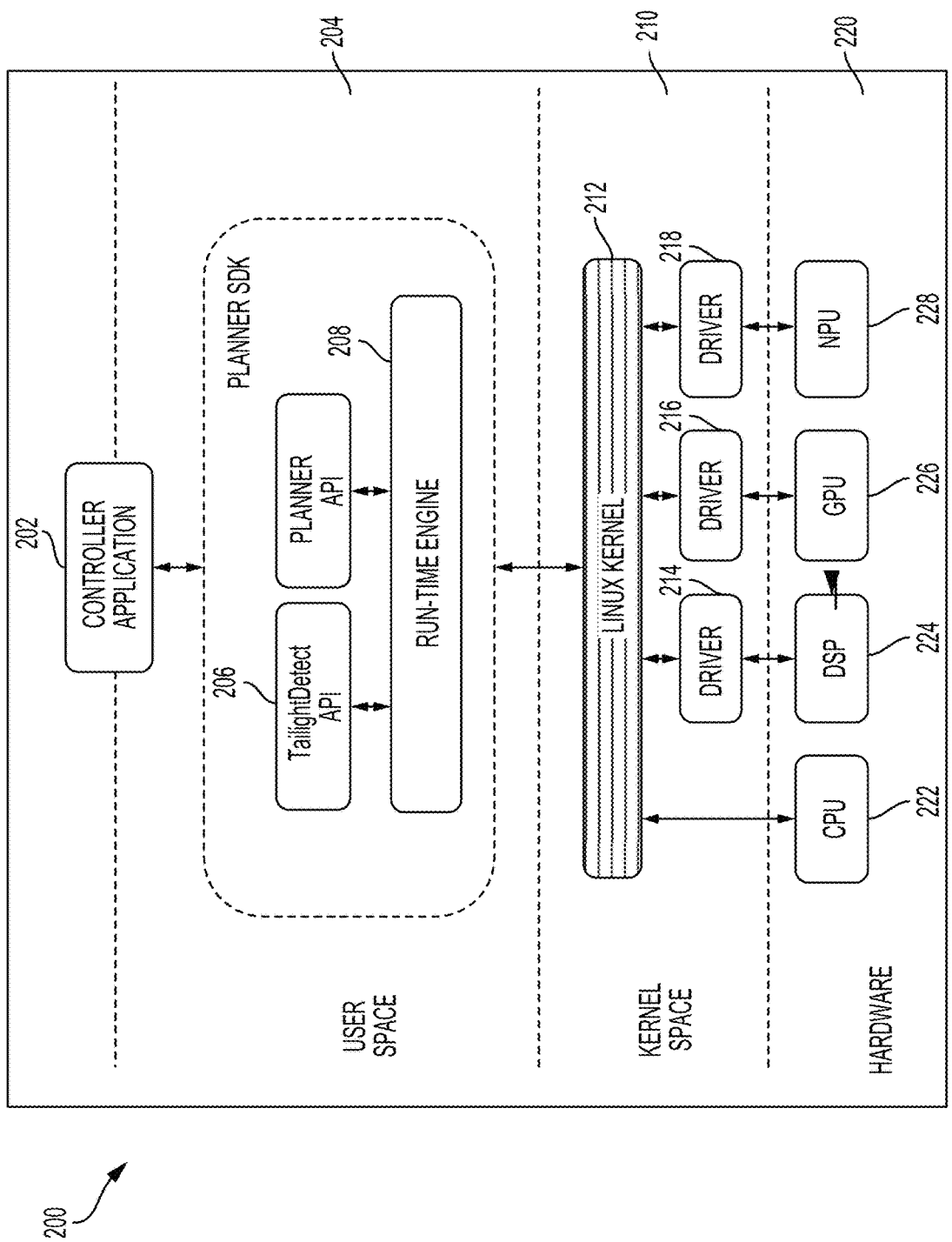
FIG. 2 is a block diagram illustrating a software architecture that may modularize artificial intelligence (AI) functions for planning and control of an autonomous agent, in accordance with various aspects of the present disclosure.

FIG. 2 is a block diagram illustrating a software architecture 200 that may modularize artificial intelligence (AI) functions for planning and control of an autonomous agent, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
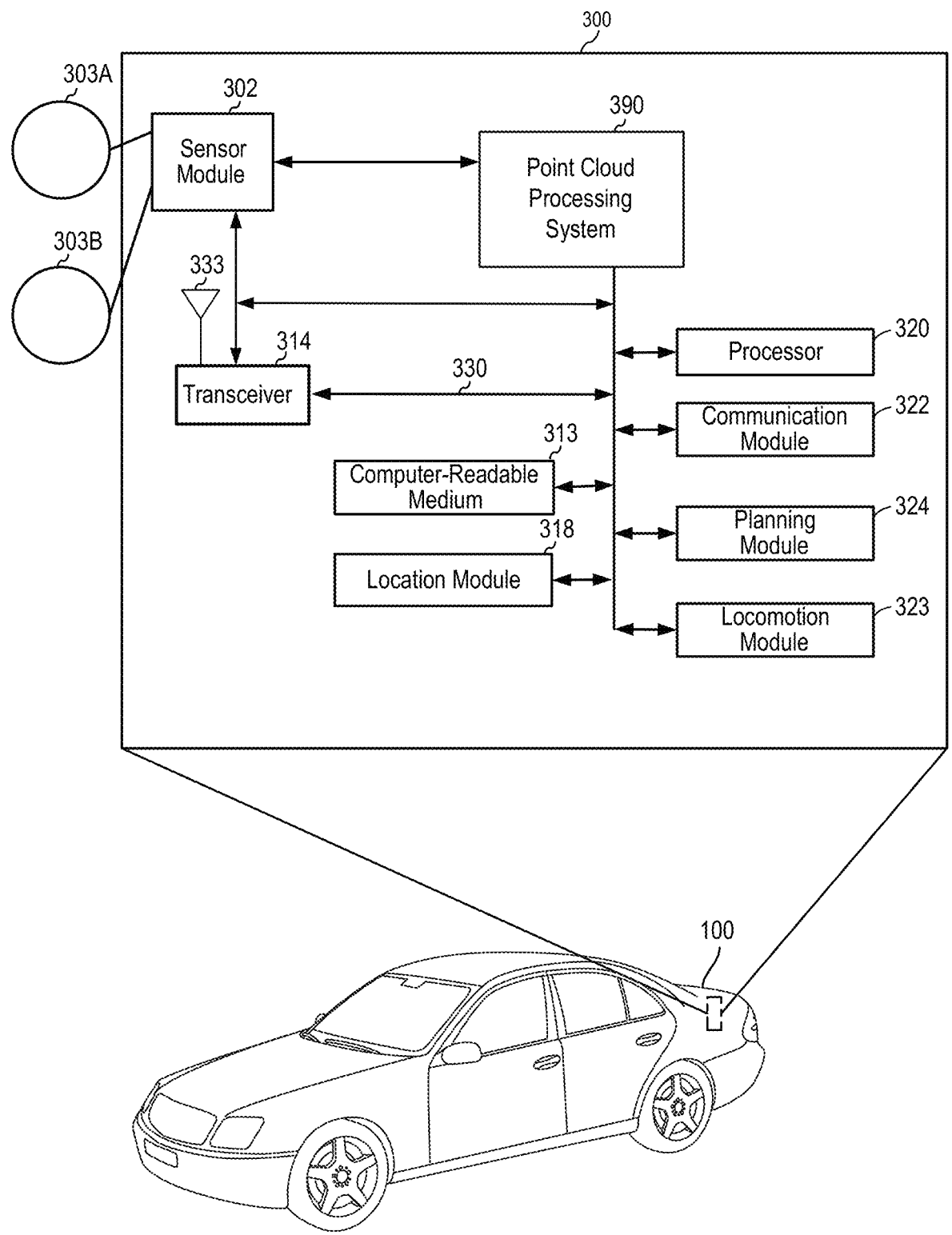
FIG. 3 is a diagram illustrating an example of a hardware implementation for a vehicle control system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a point cloud processing system 390. In some examples, point cloud processing system 390 is configured to perform operations, including operations of the process 500 described with reference to FIG. 5.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device.

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 100, or any of the modules 302, 313, 314, 318, 320, 322, 323, 324, 390. The computer-readable medium 313 may also be used for storing data that is manipulated by the processor 320 when executing the software. In some examples, the computer-readable medium 313 may function as a memory unit for the vehicle control system 300. In such examples, the computer-readable medium 313 may be any type of memory, such as RAM, SRAM, DRAM, or another type of memory. Additionally, or alternatively, the vehicle control system 300 may include another memory unit (not shown in FIG. 3) to store data that is used by one or more modules 302, 313, 314, 318, 320, 322, 323, 324, 390 associated with the vehicle control system 300.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 100 or may be in communication with the vehicle 100.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 100. For example, the location module 318 may use a global positioning system (GPS) to determine the location of the vehicle 100. The communication module 322 may be used to facilitate communications via the transceiver 314. For example, the communication module 322 may be configured to provide communication capabilities via different wireless protocols, such as, but not limited to, Wi-Fi, long term evolution (LTE), 3G, 4G, 5G, 6G, etc. The communication module 322 may also be used to communicate with other components of the vehicle 100 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 100. As an example, the locomotion module 323 may control movement of the wheels. As another example, the locomotion module 323 may be in communication with a power source of the vehicle 100, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 100, via the locomotion module 323. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The point cloud processing system 390 may be in communication with the sensor module 302, the transceiver 314, the processor 320, the communication module 322, the location module 318, the locomotion module 323, the planning module 324, and the computer-readable medium 313. In some examples, the point cloud processing system 390 may be implemented as a machine learning model, such as heterogeneous graph convolution network. Working in conjunction with one or more of the sensors 303A, 303B, the sensor module 302, and/or one or more other modules 313, 314, 318, 320, 322, 323, 324, the point cloud processing system 390 may perform various functions, such as one or more elements of the process 500 described with reference to FIG. 5.

In recent decades, point cloud data has emerged as a crucial modality for various artificial intelligence tasks, including autonomous driving, virtual reality, and view planning. Despite its wide-ranging applications, modern neural architectures for point cloud data face efficiency challenges. For instance, in the case of autonomous driving, LiDAR point cloud frames are generated at a rate of 10 to 30 Hz, with each frame including approximately 160K points. This stream of data far exceeds the processing capacity of some top-performing point cloud networks during inference time. A similar situation is observed with other 3D input devices. This disparity presents significant hurdles to the scalability and effectiveness of existing learning-based models and underscores the need for methods that reduce input size and/or improve evaluation efficiency.

Most conventional neural network architectures for point cloud data are based on graph neural networks, where the efficiency is primarily determined by the number of nodes and edges in the graph. State-of-the-art architectures typically adopt a voxel size or down-sampling rate that appropriately reduces the number of nodes without compromising the information content. However, this approach is limited by its inability to handle larger voxel sizes or smaller down-sampling rates, making it difficult to balance efficiency and performance. Empirical evidence shows that this approach leads to a significant performance drop for sparsely sampled objects compared to densely-sampled ones in the same scene.

As discussed, point cloud data is intrinsically heterogeneous. For instance, point clouds captured from a single camera position typically contain both densely and sparsely sampled regions belonging to the same surface, and indoor scene point clouds often contain both planar and noisy compositional structures. Therefore, various aspects of the present disclosure are directed to a pipeline for point cloud processing that employs both geometric primitives and individual points as nodes in a graph neural network. In such aspects, an object or scene may be represented as a combination of planes and points, offering additional flexibility while simplifying clusters of points into simpler primitives. In some examples, the pipeline may be based on a U-Net architecture, which reduces information loss when generating intermediate coarse graphs.

The U-Net architecture is a type of convolutional neural network that includes an encoder and a decoder, with skip connections between them. The encoder performs a series of convolutional and pooling operations to downsample an input and extract high-level features. The decoder upsamples feature maps and combines them with the corresponding skip connections from the encoder to produce a dense segmentation map. The skip connections enable the U-Net architecture to preserve a spatial resolution and contextual information of the input, which is particularly useful for tasks involving complex shapes or fine details. The U-Net architecture has been shown to achieve state-of-the-art performance on various image segmentation and point cloud processing tasks.

In some examples, the proposed architecture addresses several design challenges. Specifically, conventional graph neural networks are limited to homogeneous graphs. As a result, in some examples, an architecture is proposed to process heterogeneous graphs that include different primitive node types to enable effective processing of point cloud data. Furthermore, the architecture remains robust to errors that may occur while summarizing clusters of points with geometric primitives.

In some examples, two design choices are made. Firstly, clusters of points are exclusively substituted with geometric primitives only when there is a high confidence in doing so. The high confidence refers to a confidence that is equal to or greater than a confidence threshold. This approach increases a likelihood that only a smaller set of points and primitives are generated, thereby, minimizing the occurrence of false-positive geometric primitives while still retaining segments of the original point cloud. Secondly, graph convolution-style layers are constructed that use the structure of the continuous 3D Euclidean space, allowing for the integration of volumetric geometric primitives and sparse points within a unified framework. To address challenging sparsity issues in more complex LiDAR applications, a primitive-based resampling technique is introduced.

As discussed, various aspects of the present disclosure are directed to using a combination of geometric primitives and sparse points to represent point cloud input in a neural architecture. Based on this hybrid representation, an efficient architecture is introduced that improves performance while reducing memory and time complexity for various tasks in geometry processing and 3D vision. Additionally, various aspects of the present disclosure improve the scalability of learning-based models for point cloud processing tasks.

In some examples, an architecture receives a point cloud $P=\{p_i\}$ as input and produces pointwise feature vectors $\{f_i\}$. The architecture may be an example of a point cloud processing system 390 described with reference to FIG. 3. For ease of explanation, the architecture may be referred to as the point cloud processing system or the point cloud processing model. In some examples, the point cloud processing system introduces an intermediate representation, in which the point cloud is transformed into a combination of points and geometric primitives. This approach may reduce time and space complexity while increasing the efficiency of the point cloud processing system. This design may improve the scalability and effectiveness of learning-based models for point cloud processing tasks.

In some examples, the point cloud processing system computes a combination of geometric primitives and sparse points to represent 3D scenes or objects. This is achieved by using a primitive fitting function that identifies and converts patches of points into geometric primitives, such as lines, planes, and 3D rectangular volumes.

Conventional primitive fitting functions adopt a proposal-and-rejection framework, where a set of candidate primitives are proposed first, then accepted if certain conditions are met. However, the performance of such conventional primitive fitting functions relies on a quality of input point clouds as well as hyperparameters. These conventional primitive fitting functions struggle to balance two competing goals: detecting as many true-positive primitives as possible (high coverage), and rejecting false-positive primitives (high precision). These goals are not easily solved, particularly when the point cloud is irregularly sampled.

Notwithstanding, given their efficiency and variance reduction capability, primitive fitting functions may still be useful for representing point clouds. In some examples, primitive fitting functions may be specified to identify a set of geometric primitives associated with a confidence that is greater than or equal to a confidence threshold, rather than being tasked with achieving both good coverage and precision. By identifying the set of geometric primitives, aspects of the present disclosure may generate a hybrid representation that contains fewer elements, without low quality primitives that could negatively impact performance. In some examples, the primitive fitting function uses a plane fitting function to balance efficiency and performance. The steps of the primitive fitting function are summarized in Function 1, described below.

| Function 1 |
|---|
| Input: A point cloud, grid size $(V_x, V_y, V_z)$, hyper-parameters $\sigma, \tau_1, \tau_2, \tau_3$. |
| 1. Partition the point cloud into grids of size $(V_x, V_y, V_z)$. |
| 2. Initialize the output queue of primitives as empty $Q_1 \leftarrow \phi$. |
| 3. Initialize the output queue of points as empty $Q_2 \leftarrow \phi$. |
| for each grid containing points $\{p_i\}$ do |
| 4. $\forall i, w_i \leftarrow 0$ |
| for Iterate until $\{w_i\}$ converge do |
| 5. Compute the center, eigenvalues and eigenvectors |
| $c, \{\lambda_j, v_j \mid j = 1,2,3\} \leftarrow PCA(\{(p_i, w_i)\})$ |
| 6. Compute point to primitive distance |

Function 1

$$d_i^2 \leftarrow \sum_{j=1,2,3} \left[|(p_i - c)^T v_j| - \lambda_j\right]_+^2$$

7. $\forall i, w_i \leftarrow \dfrac{\sigma^2}{\sigma^2 + d_i^2}$.

end for

8. Let $\mathcal{P}_1 = \{p_i \mid w_i > \tau_1\}, \mathcal{P}_2 = \{p_i \mid w_i \leq \tau_1\}$ 9. Estimate confidence $f \leftarrow |\mathcal{P}|/\tau_2 + \tau_3 / \dfrac{\sum_{p_i \in \mathcal{P}} w_i d_i}{\sum_{p_i \in \mathcal{P}} w_i}$ if $f > \dfrac{1}{2}$ then $\mathcal{Q}_1 \leftarrow \mathcal{Q}_1 \cup \{(c, \lambda, v)\}$
$\mathcal{Q}_2 \leftarrow \mathcal{Q}_2 \cup \mathcal{P}_2$
else
$\mathcal{Q}_2 \leftarrow \mathcal{Q}_2 \cup \mathcal{P}_1 \cup \mathcal{P}_2$
end if
end for
Output: $\mathcal{Q}_1, \mathcal{Q}_2$ As shown in Function 1, the primitive fitting function receives, as an input, a point cloud having a grid size ($V_x$, $V_y$, $V_z$) and hyper-parameters $\sigma$, $\tau_1$, $\tau_2$, $\tau_3$. In Function 1, $\sigma$ represents a hyperparameter that controls the scaling of the point-to-primitive distance. Specifically, $\sigma$ balances the contribution of the point-to-primitive distance with the initial weight of the point. $\tau_1$ represents a hyperparameter that controls the threshold for the initial weight of a point. Points with an initial weight below $\tau_1$ are considered noise and will not be used to form primitives. $\tau_2$ and $\tau_3$ represent hyperparameters that control a threshold for confidence estimation. A primitive is considered confident if its confidence $f$, which is a function of $\tau_2$ and $\tau_3$, is greater than a value, such as two.

As shown in Function 1, the primitive fitting function partitions the point cloud into the grid size ($V_x$, $V_y$, $V_z$). The primitive fitting function then initializes a first output queue $\mathcal{Q}_1$ of primitives as empty ($\mathcal{Q}_1 \leftarrow \phi$) and a second output queue of points $\mathcal{Q}_2$ as empty ($\mathcal{Q}_2 \leftarrow \phi$). In the context of Function 1, primitives refer to basic geometric shapes or structures that are used to represent the underlying surfaces or objects in the point cloud data. These primitives can include, but are not limited to, lines, planes, cylinders, and spheres. The use of primitives can help reduce the complexity of the point cloud data by compressing large sets of points into simpler geometric shapes, which can then be used to efficiently perform various tasks such as segmentation, classification, and object recognition. In Function 1, $\phi$ represents an empty queue.

After initializing the first output queue $\mathcal{Q}_1$ and the second output queue $\mathcal{Q}_2$, Function 1 initializes a loop, where, for each grid containing points $\{p_i\}$, a weight $w_i$ of each point is set to zero ($\forall_i, w_i : 0$). Function 1 then iterates until the weight $\{w_i\}$ of each point is stable (e.g., converges) (for Iterate until $\{w_i\}$ do), such that no further updates may be specified. In each iteration of the loop, Function 1 computes a center c, eigenvalues $\lambda_j$, and eigenvectors $v_j$ of the point cloud using a principal component analysis (PCA) function on a weighted set of points (c, $\{\lambda_j, v_j | j=1, 2, 3\} \leftarrow \text{PCA}(\{(p_i, w_i)\})$). The PCA function identifies a main axes or directions of variation in a set of data points. The eigenvalues $\lambda_j$ indicate a magnitude of variance along each principal axis, while the eigenvectors $v_j$ represent the directions of the axes. The eigenvectors $v_j$ may define an orientation of the geometric primitives that will be fitted to the points within the grid.

Function 1 then determines a point-to-primitive distance ($d_i^2 \leftarrow \Sigma_{j=1,2,3}[|(p_i-c)^T v_j|-\lambda_j]_+^2$). The point-to-primitive distance represents a distance between a point $p_i$ and a geometric primitive represented by the center c and the eigenvectors $v_j$ with eigenvalues $\lambda_j$. The resulting value $d_i^2$ represents the squared distance between the point $p_i$ and the primitive represented by the center c and the eigenvectors $v_j$. This distance metric is used to determine the weights of each point and to identify the set of points that belong to a particular geometric primitive.

This process continues until the weight values converge, which indicates that the algorithm has found a set of weights that effectively captures the underlying structure of the point cloud data. Once the weights have converged, the loop exits and the algorithm proceeds to the next grid. At line 7 of Function 1, the weight $w_i$ for each point $p_i$ is determined based on its point-to-primitive distance $$d_i^2 \left( \forall_i, w_i \leftarrow \frac{\sigma^2}{\sigma^2 + d_i^2} \right).$$

The weight $w_i$ determines whether the point $p_i$ should be included in the set of points that belong to a particular primitive.

The weight calculation $$\left( \forall_i, w_i \leftarrow \frac{\sigma^2}{\sigma^2 + d_i^2} \right)$$

involves dividing the constant $\sigma^2$ by the sum of $\sigma^2$ and the point-to-primitive distance $d_i^2$. This creates a weight that is smaller for points that are further away from the primitive and larger for points that are closer. The weight $w_i$ may be normalized to be between 0 and 1, such that it may be interpreted as a probability. Points with higher weights are more likely to belong to the primitive, while points with lower weights are less likely. This weight calculation is used to identify the set of points that belong to a particular geometric primitive, as well as to estimate the confidence of the primitive fitting algorithm in a later step.

Function 1 then separates the points $\{p_i\}$ in a grid into two sets $\mathcal{P}_1$ and $\mathcal{P}_2$ based on their respective weights $w_i$ (Let $\mathcal{P}_1=\{p_i|w_i>\tau_1\}$, $\mathcal{P}_2=\{p_i|w_i\leq\tau_1\}$). Specifically, points $p_i$ with weights $w_i$ greater than the threshold value $\tau_1$ are placed in the first set $\mathcal{P}_1$, while the points $p_i$ with weights $w_i$ less than or equal to $\tau_1$ are placed in the second set $\mathcal{P}_2$. This separation may identify a set of points that belong to a particular geometric primitive. For example, points with higher weights (in $\mathcal{P}_1$) are more likely to belong to the primitive, while points with lower weights (in $\mathcal{P}_2$) are less likely.

The threshold value $\tau_1$ represents a hyperparameter that determines the trade-off between the number of points included in the primitive and the precision of the primitive fitting. A higher value of $\tau_1$ leads to fewer points in the first set $\mathcal{P}_1$ and a more precise primitive, while a lower value of $\mathcal{P}_1$ includes more points in the first set $\mathcal{P}_1$ but may result in a less precise primitive. The value of $\tau_1$ may be selected based on the characteristics of the input point cloud and the desired performance of the primitive fitting function.

After separating the points $\{p_i\}$ in a grid into the two sets $\mathcal{P}_1$ and $\mathcal{P}_2$, Function 1 estimates a confidence $f$ of a set of geometric primitives extracted from a grid in the point cloud $$\left( f \leftarrow |\mathcal{P}|/\tau_2 + \tau_3 \Big/ \frac{\sum_{p_i \in \mathcal{P}} w_i d_i}{\sum_{p_i \in \mathcal{P}} w_i} \right),$$

where $|\mathcal{P}|$ represents the number of points in the grid, $\sum_{p_i \in \mathcal{P}} w_i d_i$ represents the sum of the weighted distances between each point pi in the grid and its corresponding geometric primitive, and $\sum_{p_i \in \mathcal{P}} w_i$ represents the sum of the weights for each point in the grid. In such examples, the confidence $f$ may be a ratio between a number of points in the grid $|\mathcal{P}|$ and a weighted average distance between the points and the geometric primitive. If this ratio exceeds a threshold value, the set of primitives extracted from the grid is considered confident enough to be included in the final output.

In some examples, if the confidence $f$ is greater than a value, such as ½, a primitive set $Q_1$ may be updated with the new primitive $\{c, \lambda, v\}$ ($Q_1 \leftarrow Q_1 \cup \{(c, \lambda, v)\}$), and a sparse point set $Q_2$ is updated with the points in $\mathcal{P}_2$ ($Q_2 \leftarrow Q_2 \cup \mathcal{P}_2$). On the other hand, if the confidence level is less than or equal to the value (e.g., ½), the sparse point set $Q_2$ is updated with the points in both $Q_2$ and $\mathcal{P}_2$ ($Q_2 \leftarrow Q_2 \cup \mathcal{P}_1 \cup \mathcal{P}_2$). The output of Function 1 is the sets $Q_2$ and $Q_2$, which respectively contain the geometric primitives and sparse points that were extracted from the original point cloud.

As a summary, Function 1 is associated with a plane fitting function that takes a point cloud as input and outputs a set of geometric primitives such as lines, planes, and 3D rectangular volumes. Function 1 partitions the input point cloud into small grids and iteratively fits planes to the points within each grid. In each iteration, Function 1 computes the center, eigenvalues, and eigenvectors of the points within the grid using principal component analysis (PCA). It then computes the point-to-plane distance for each point, which is a measure of how well the point fits the estimated plane. Based on the point-to-plane distances, Function 1 assigns weights to the points within the grid.

Function 1 then separates the points with high weights from the other points, and estimates the confidence of the fitted plane using a threshold value. If the confidence is high, the estimated plane is added to the output queue of primitives $Q_1$, and the points with low weights are added to the output queue of points $Q_2$. Otherwise, all the points within the grid are added to $Q_2$. Function 1 repeats this process for each grid, and the final output consists of two sets: $Q_1$ contains the estimated geometric primitives, and $Q_2$ contains the remaining points that were not fitted by the algorithm.

Figure 4:
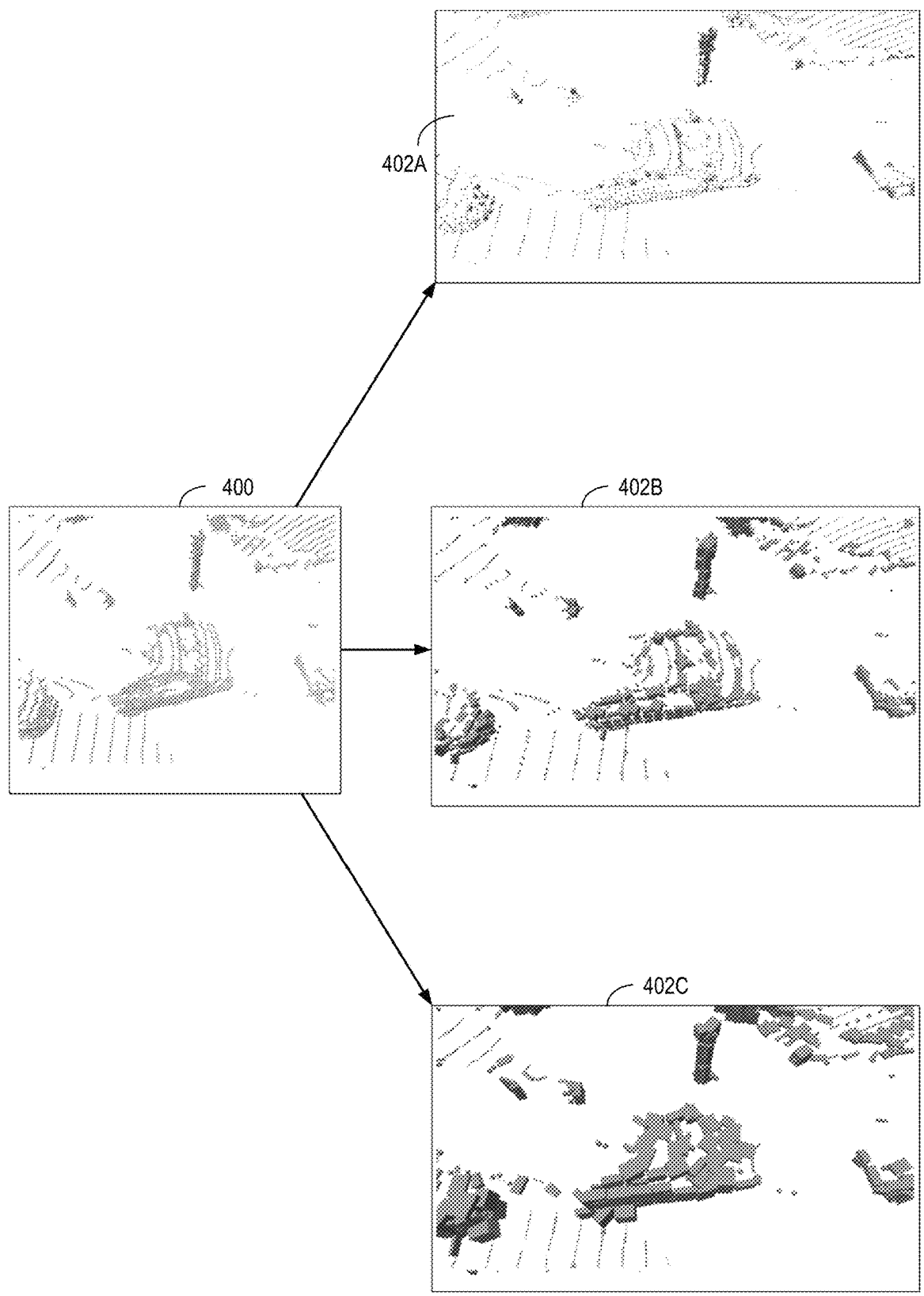
FIG. 4 is a diagram illustrating examples of the results of applying a primitive fitting function to a point cloud, in accordance with various aspects of the present disclosure.

FIG. 4 is a diagram illustrating examples of the results of applying a primitive fitting function to a point cloud 400, in accordance with various aspects of the present disclosure. The point cloud 400 may be generated based on information that is obtained from one or more sensors, such as the sensors 106, 108 described with reference to FIG. 1A or the sensors 303A, 303B described with reference to FIG. 3, associated with an agent, such as the vehicle 100 described with respect to FIGS. 1A, 1B, and 3.

As described, the point cloud 400 may be divided (e.g., summarized) into a collection of primitives $Q_1$ and points $Q_2$. In some examples, the point cloud 400 may be hierarchically processed with different granularity levels to generate multiple groups of primitives and multiple sets of points, each group of primitives and set of points associated with a respective granularity level. Additionally, a group of intermediate sets may be associated with the point cloud. Each intermediate set may be associated with one group of primitives, of the multiple groups of primitives, and one set of points, of the multiple sets of points, having a same granularity level. Each intermediate set may also be referred to as a representation set or a hybrid set.

The group of intermediate sets sequence may be an example of coarse-to-fine intermediate sets refers to a series of progressively refined sets of data. As discussed, each intermediate set contains a mixture of points and primitives and represents a different granularity level. FIG. 4 illustrates examples of scenes 402A, 402B, and 402C associated with the point cloud 400, where each scene 402A, 402B, and 402C represents a different granularity level (e.g., level of detail). Each granularity level may be associated with a respective voxel size, set of respective hyperparameters, and/or respective grid size.

For example, a first scene 402A may be associated with smaller granularity level (e.g. fine granularity) in comparison to the other scenes 402B and 402C, such that a smallest number of points are associated with primitives 404 in comparison to the other scenes 402B and 402C. That is, the granularity changes from fine to coarse from the first scene 402A to the last scene 402C. For ease of explanation, only one primitive 404 is labeled in the first scene 402A. A second scene 402B may be associated with a higher granularity level in comparison to the first scene 402A, such that more points are associated with primitives 406 in comparison to the first scene 402A. For ease of explanation, only one primitive 406 is labeled in the second scene 402B. A third scene 402C may be associated with a higher granularity level in comparison to the second scene 402B, such that more points are associated with primitives 408 in comparison to the second scene 402B. For ease of explanation, only one primitive 408 is labeled in the third scene 402C.

Accordingly, the hierarchical approach may divide the input point cloud into large, coarse regions and then successively refined into smaller, finer regions, or vice versa. The feature extraction may be performed on each set, starting with the coarsest set and progressing towards the finest set. This hierarchical approach allows the point cloud processing system to capture both the global and local features of the scene or object represented by the point cloud.

In some examples, after summarizing a point cloud into a collection of primitives $Q_1$ and points $Q_2$, aspects of the present disclosure develop a learning architecture that processes the hybrid representation of primitives $Q_1$ and points $Q_2$. The error in some primitive fitting functions may result in unreliable detection of primitives in the original geometry. This is more common when prioritizing primitive fitting precision over coverage. As a result, the feature extraction function should be consistent and invariant against false negatives. To achieve this, a heterogeneous graph neural network associated with the point cloud processing system may be designed to output consistent features for both patches of points and primitives derived from the patches of points.

Additionally, to avoid the complexity of communication between different feature spaces, which involves a quadratic number of edge categories, aspects of the present disclosure treat all primitives as regions in a 3D Euclidean space and associate each primitive with an implicit feature function. This function smoothly maps every point in the region to a potentially different feature, while isolated points are assigned a single feature. In some examples, implicit feature functions have a low-rank structure, which further enhances the efficiency of our architecture. This approach avoids treating primitives and points as different types of nodes and simplifies the design of the heterogeneous graph neural network.

In some examples, the heterogeneous graph neural network receives a point cloud as an input and performs primitive fitting using Function 1. The output of the primitive fitting is a set of points $\{p_i\}$ ($Q_2$) and a set of primitives ($Q_1$). Each primitive is represented by a center c, three eigenvalues $\lambda_i$, and three eigenvectors $v_i$. The volume of a primitive is defined as the rectangular space centered at c, with its dimension and orientation determined by the eigenvectors and eigenvalues.

A feature of a primitive may be represented as a matrix $F \in \mathbb{R}^{D \times K}$, where D is the feature dimension and K is the rank of the primitive. In some examples, K=2 for lines, K=3 for planes, and K=4 for volumes. Each point within a primitive is associated with a coordinate vector $\alpha \in \mathbb{R}^K$, such that the feature at a specific point $x \in \mathbb{R}^3$ (e.g., a point in a 3D space) is given by:

$$f_x = F\alpha_x. \quad (1)$$

In Equation 1, $f_x$ represents the feature vector for a specific point x in the 3D space. The feature vector is obtained by multiplying the matrix F with the coordinate vector $\alpha_x$ that represents the position of the point x in the local coordinate system of the primitive to which it belongs. In some examples, the coordinate vector for a point in a 3D volume is a four dimensional vector $(1, \{v_j^T(x-c)\}_{j=1,2,3}$, where $v_j$ represents the eigenvectors, the first dimension models the constant additive feature and the additional dimensions model the deviation of feature.

In some examples, aUNet architecture may be used to construct the hierarchical graph neural network that involves a sequence of coarse-to-fine intermediate sets $G_1$, $G_2$, $G_3$, ..., where each set $G_i$ contains a mixture of points and primitives. To create each intermediate set $G_i$, Function 1 may be used with various voxel sizes and hyperparameters on the input point cloud. In some examples, the resulting points may be sampled using grid sampling with a same voxel size and then merged with the primitives.

In some examples, features of each intermediate set $G_j$ may be calculated from the feature of the previous set $G_{j-1}$ and a bipartite graph between the current set $G_j$ and the previous set $G_j$. The edges of the graphs are determined by radius search. The first intermediate set, $G_1$, may be computed from the input point clouds by treating the each point in the input point clouds as a node in a graph $G_0$, in which the graph $G_0$ is not connected (e.g., all points are isolated). In some examples, a set of point feature vectors $\{f_i\}$, a set of primitives $\mathcal{F}$ and their feature matrices $\{F_j\}$ in $G_{j-1}$ may be considered to define the output feature at a specific location $x \in \mathbb{R}^3$. Specifically, the output feature may be defined as follows:

$$f^{out}(x) = \sum_{p_i \in \mathcal{N}(x)} h_\theta(f_i, p_i - x) + \sum_{p_j \in \mathcal{N}(x)} w_j \int_{\mathcal{P}_j} h(F_j \alpha(y), y - x) dy \quad (2)$$

In Equation 2, $w_j$ represents a number of points contained in the primitive $\mathcal{P}_j$, and $\mathcal{N}(x)$ is the neighborhood of x defined by radius search. $h_\theta(f, y)$ is an example of a convolution function. For example, a three-layer multi-layer perceptron receives a vector $[f, y] \in \mathbb{R}^{D+3}$ as an input. $h_\theta(f_i, p_i-x)$ represents a feature vector of a point $p_i$ that is located in the neighborhood of x. This term is computed by applying the convolution function $h_\theta$ to the feature vector $f_i$ and the vector difference $(p_i-x)$.

In such examples, each point p in $G_j$ may be assigned a feature vector represented by $f^{out}(p)$. For a primitive volume $\mathcal{V}$, a set of locations $Q=\{q_k\}$ within the volume $\mathcal{V}$ is sampled using grid sampling, and their corresponding coordinate vectors $\{\alpha_k \in \mathbb{R}^K\}$ are computed. The feature matrix F of the primitive may be updated through a linear equation system. Specifically, the feature vector $f^{out}(q_k)$ may be solved at each sampled location $q_k$ in the primitive using the coordinate vector $\alpha_k$. This results in a set of linear equations $f^{out}(q_k)=F\alpha_k$, $\forall q_k \in Q$. These linear equations can be expressed in matrix form as $F^{out}=FA$, where $F^{out}$ is the stacked feature vector at all locations in the primitive, and A is a matrix containing the coordinate vectors. The solution for F may be obtained through a least squares solution $(F=F^{out} A^T(AA^T)^{-1})$, where $A^T$ represents a transpose of matrix A and $(AA^T)^{-1}$ is an inverse of a small matrix of size K×K. Additionally, $F^{out} \in \mathbb{R}^{D \times \|Q\|}$ includes $f^{out}(q_k)$ in its columns, and $A \in \mathbb{R}^{K \times \|Q\|}$ includes $\alpha_k$ in its columns. In some examples, as a size of $Q$ decreases, efficiency may increase, and memory use may decrease when computing $f^{out}(q_k)$.

As described, aspects of the present disclosure are directed to a method and system for processing point cloud data using a heterogeneous graph neural network. In some examples, the point cloud may be summarized into a collection of primitives and a remaining collection of points using a primitive fitting function (Function 1). The resulting primitives and points are then used to build a hierarchical graph neural network, where each intermediate set of the network contains a mixture of points and primitives. The feature of each primitive is represented as a matrix, and the feature of each point is computed using a convolution function. The network may be trained to output consistent features for both primitives and points, even in the presence of false negatives. The resulting system is able to effectively and efficiently process point cloud data, even when the data is complex and noisy.

Figure 5:
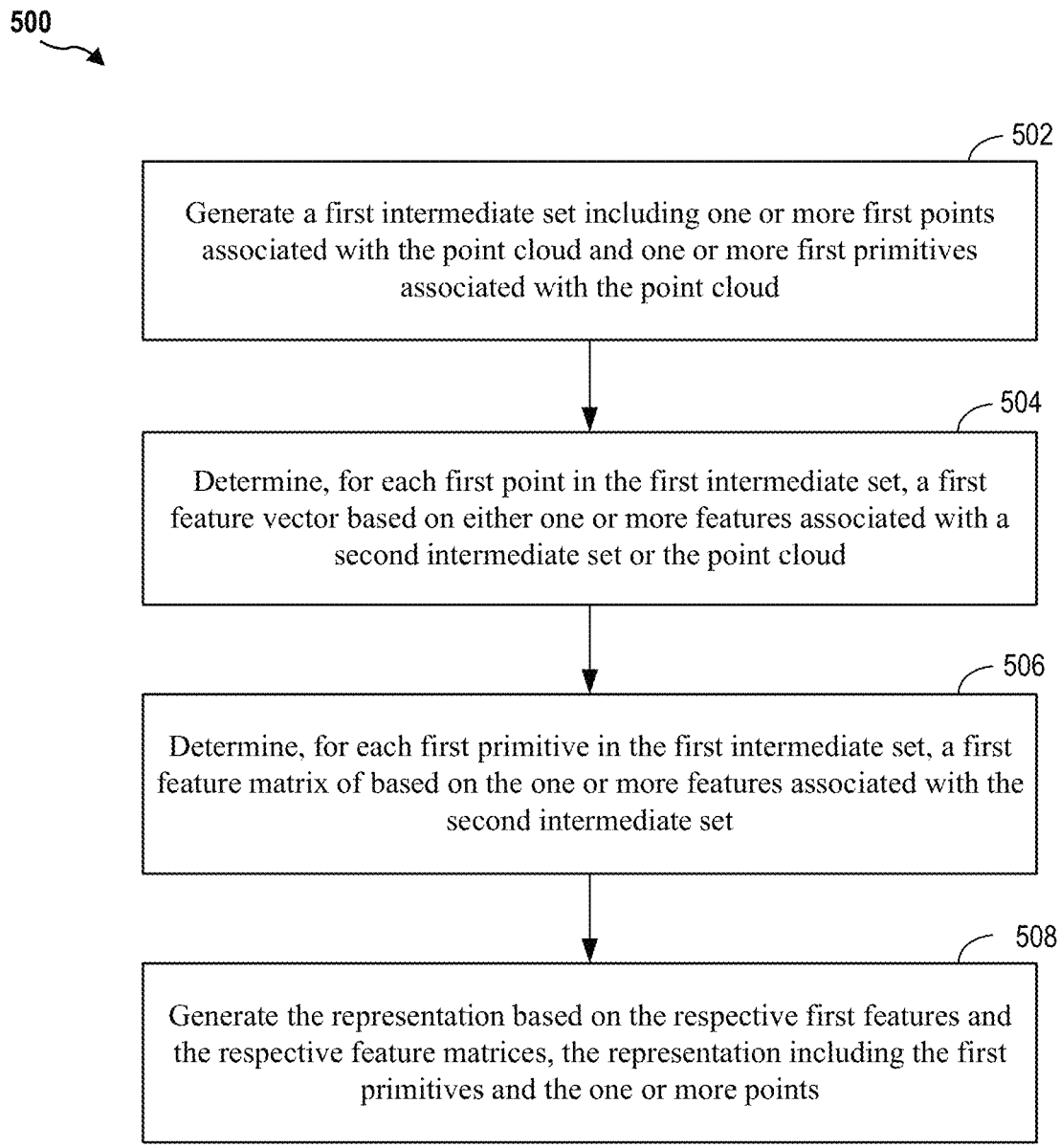
FIG. 5 illustrates a flow diagram for a process for generating a representation of an environment based on a point cloud, in accordance with various aspects of the present disclosure.

FIG. 5 is a diagram illustrating an example process 500 performed in accordance with various aspects of the present disclosure. The process 500 may be performed by a vehicle, such as a vehicle 100 as described with reference to FIGS. 1A and 1B, and/or a depth estimation module of a vehicle, such as the point cloud processing system 390 as described with reference to FIG. 3. The vehicle may be referred to as an agent. The example process 500 is an example of processing a point cloud to replace clusters of points with geometric primitives, such that an object or a scene may be represented as a collection of geometric primitives (e.g., planes) and points. As shown in the example of FIG. 5, the process 500 begins at block 502 by hierarchically processing the point cloud with different granularity levels to generate multiple groups of primitives and multiple sets of points. Each group of primitives and set of points may be associated with a respective granularity level. Each granularity level of the different granularity levels is associated with one or more of a respective voxel size of a group of voxel sizes, a respective set of hyperpameters, or a respective grid size of a group of grid sizes. In some examples, the point cloud may be captured via one or more sensors associated with an agent. In some examples, an action of the agent may be controlled based on generating the representation. The agent may be an autonomous or semi-autonomous device.

At block 504, the process 500 generates a group of intermediate sets associated with the point cloud, each intermediate set associated with one group of primitives, of the multiple groups of primitives, and one set of points, of the multiple sets of points, having a same granularity level. The group of intermediate sets may be a sequence of course-to-fine intermediate sets. Additionally, the respective features may be iteratively determined based on a bipartite graph of a first intermediate set of the group of representation and a previous intermediate set of the sequence of intermediate sets. Each primitive in the multiple groups of primitives may be, for example, a line, a plane, or a three-dimensional volume. Additionally, each primitive in the multiple groups may be associated with a center value, one or more eigenvalues, and one or more eigenvectors, At block 506, the process 500 iteratively determines respective features associated with each intermediate set of a sequence of intermediate sets, each intermediate set included the set of primitives and the set of points, the respective features including first features of the set of primitives and second features of the set of points. At block 508, the process 500 generates the visual representation based on the respective features of each intermediate set of the sequence of intermediate sets.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for generating a visual representation of an environment based on a point cloud associated with the environment, comprising:
    hierarchically processing the point cloud with different granularity levels to generate multiple groups of primitives and multiple sets of points, each group of primitives and set of points associated with a respective granularity level;
    generating a group of intermediate sets associated with the point cloud, each intermediate set associated with one group of primitives, of the multiple groups of primitives, and one set of points, of the multiple sets of points, having a same granularity level;
    iteratively determining respective features associated with each intermediate set of a sequence of intermediate sets, each intermediate set included the set of primitives and the set of points, the respective features including first features of the set of primitives and second features of the set of points; and
    generating the visual representation based on the respective features of each intermediate set of the sequence of intermediate sets.

2. The method of claim 1, wherein each granularity level of the different granularity levels is associated with one or more of a respective voxel size of a group of voxel sizes, a respective set of hyperpameters, or a respective grid size of a group of grid sizes.

3. The method of claim 1, wherein:
    the group of intermediate sets is a sequence of course-to-fine intermediate sets; and
    the respective features are iteratively determined based on a bipartite graph of a first intermediate set of the group of representation and a previous intermediate set of the sequence of intermediate sets.

4. The method of claim 1, further comprising capturing the point cloud via one or more sensors associated with an agent.

5. The method of claim 4, further comprising controlling an action of the agent based on generating the representation, wherein the agent is an autonomous or semi-autonomous device.

6. The method of claim 1, wherein each primitive in the multiple groups of primitives is a line, a plane, or a three-dimensional volume.

7. The method of claim 1, wherein each primitive in the multiple groups is associated with a center value, one or more eigenvalues, and one or more eigenvectors.

8. An apparatus for generating a visual representation of an environment based on a point cloud associated with the environment, comprising:
one or more processors; and
one or more memories coupled with the one or more processors and storing instructions operable, when executed by the one or more processors, to cause the apparatus:
hierarchically process the point cloud with different granularity levels to generate multiple groups of primitives and multiple sets of points, each group of primitives and set of points associated with a respective granularity level;
generate a group of intermediate sets associated with the point cloud, each intermediate set associated with one group of primitives, of the multiple groups of primitives, and one set of points, of the multiple sets of points, having a same granularity level;
iteratively determine respective features associated with each intermediate set of a sequence of intermediate sets, each intermediate set included the set of primitives and the set of points, the respective features including first features of the set of primitives and second features of the set of points; and
generate the visual representation based on the respective features of each intermediate set of the sequence of intermediate sets.

9. The apparatus of claim 8, wherein each granularity level of the different granularity levels is associated with one or more of a respective voxel size of a group of voxel sizes, a respective set of hyperpameters, or a respective grid size of a group of grid sizes.

10. The apparatus of claim 8, wherein:
the group of intermediate sets is a sequence of course-to-fine intermediate sets; and
the respective features are iteratively determined based on a bipartite graph of a first intermediate set of the group of representation and a previous intermediate set of the sequence of intermediate sets.

11. The apparatus of claim 8, wherein execution of the instructions further cause the apparatus to capture the point cloud via one or more sensors associated with an agent.

12. The apparatus of claim 11, wherein execution of the instructions further cause the apparatus to control an action of the agent based on generating the representation, wherein the agent is an autonomous or semi-autonomous device.

13. The apparatus of claim 8, wherein each primitive in the multiple groups of primitives is a line, a plane, or a three-dimensional volume.

14. The apparatus of claim 8, wherein each primitive in the multiple groups is associated with a center value, one or more eigenvalues, and one or more eigenvectors.

15. A non-transitory computer-readable medium having program code recorded thereon for generating a visual representation of an environment based on a point cloud associated with the environment, the program code executed by a processor and comprising:
program code to hierarchically process the point cloud with different granularity levels to generate multiple groups of primitives and multiple sets of points, each group of primitives and set of points associated with a respective granularity level;
program code to generate a group of intermediate sets associated with the point cloud, each intermediate set associated with one group of primitives, of the multiple groups of primitives, and one set of points, of the multiple sets of points, having a same granularity level;
program code to iteratively determine respective features associated with each intermediate set of a sequence of intermediate sets, each intermediate set included the set of primitives and the set of points, the respective features including first features of the set of primitives and second features of the set of points; and
program code to generate the visual representation based on the respective features of each intermediate set of the sequence of intermediate sets.

16. The non-transitory computer-readable medium of claim 15, wherein each granularity level of the different granularity levels is associated with one or more of a respective voxel size of a group of voxel sizes, a respective set of hyperpameters, or a respective grid size of a group of grid sizes.

17. The non-transitory computer-readable medium of claim 15, wherein:
the group of intermediate sets is a sequence of course-to-fine intermediate sets; and
the respective features are iteratively determined based on a bipartite graph of a first intermediate set of the group of representation and a previous intermediate set of the sequence of intermediate sets.

18. The non-transitory computer-readable medium of claim 15, wherein execution of the instructions further cause the apparatus to capture the point cloud via one or more sensors associated with an agent.

19. The non-transitory computer-readable medium of claim 18, wherein execution of the instructions further cause the apparatus to control an action of the agent based on generating the representation, wherein the agent is an autonomous or semi-autonomous device.

20. The non-transitory computer-readable medium of claim 15, wherein each primitive in the multiple groups of primitives is a line, a plane, or a three-dimensional volume.

* * * * *